Patented Apr. 26, 1927.

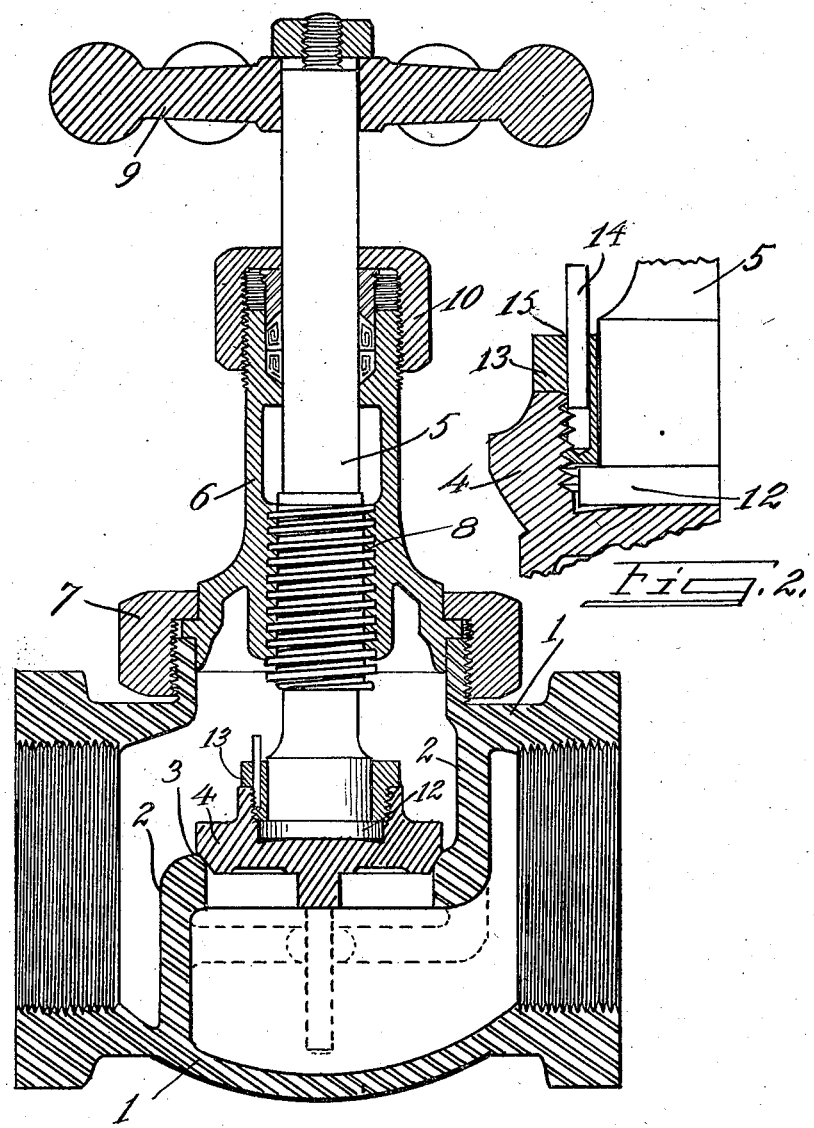

1,626,532

UNITED STATES PATENT OFFICE.

FREDERICK H. HEHEMANN, OF CINCINNATI, OHIO, ASSIGNOR TO THE LUNKENHEIMER COMPANY, OF CINCINNATI, OHIO, A CORPORATION OF OHIO.

VALVE.

Application filed April 4, 1923. Serial No. 629,756.

My invention relates to valves provided with renewable valve disks and the object of the invention is to provide a simple, cheap and effective construction for locking in place the plug or member to which the valve disk is secured.

Devices have heretofore been provided to lock renewable valve disks in place, but such devices have involved extra screw-threaded parts increasing the expense in manufacture especially in valves of small sizes, and in certain other constructions where the valve disk and locking device are fitted together as a unit, the replacing of the entire unit when the replacement of the valve disk becomes necessary on account of wear, increasing the cost of maintenance, all of which is obviated by my simple and inexpensive construction.

In the drawings:

Figure 1 is a central section of the valve complete.

Figure 2 is a detail section of the retaining plug and valve disk.

The valve is of the ordinary type familiarly known as a Globe valve with a renewable valve disk in which 1 is the valve casing with the central partition 2 provided with a central opening for the valve seat 3, upon which the valve disk 4 is seated. The valve disk is loosely secured to the valve stem 5, which projects outwardly through the bonnet 6, the bonnet being secured over the opening in the casing by the union bonnet ring 7. The valve stem is provided with screwthreads 8 of large pitch engaging the threaded recess in the bonnet and the stem is rotated to raise and lower the valve by the usual hand wheel 9, the valve stem being protected from leakage by the usual stuffing box 10. This briefly involves the ordinary and usual construction of the type of valve to which my improvements are applied.

The lower end of the valve stem has an annular flange 12 upon which is mounted the plug 13, which is slipped down over the stem before the parts are assembled. The valve disk is screwed on this plug and thus the disk and plug will be secured loosely on the end of the stem.

Especially for small sized valves, it is not easy to provide a simple method for locking the plug 13 to the valve disk 4 and this I have accomplished in my present construction by means of a simple lock pin 14. A hole 15 is bored through the flange of the plug 13 and extended through the threads of the plug forming a keyway for the lockpin 14. The corresponding keyway in the valve disk threads is cut by the lockpin when it is driven home after the plug and valve disk are assembled on the stem and thus securely locking the parts together. With my method any plug may be keyed to any valve disk, which it fits otherwise, and the lockpin will cut the necessary keyway through the valve disk threads regardless of the position occupied by the hole 15 after the parts are assembled. This provides a very cheap and most effective method for locking the plug and disk together. The hole through the head and thread of the plug serves to hold and support the pin so that it can be driven home in such a way as to cut a groove through the valve disk thread, thereby avoiding any distortion of the threads, which would prevent the replacement of either the valve disc or plug, or taking up on the plug engagement.

Although I have, in the present instance, shown and described only one embodiment of the locking device, which will give in practice satisfactory and reliable results, it is to be understood that it can be applied to various articles of manufacture without departing from the spirit or scope of the invention.

Having thus described my invention, what I claim as new and desire to secure by Letters Patent, is:—

In a valve construction, the combination with the valve stem, of a retaining plug rotatively mounted on said valve stem, said plug having an upper flanged portion and a threaded lower portion, a valve disc threaded on said threaded portion of the plug and abutting the flanged portion, a lock pin for securing the plug and the disc together, said plug having an aperture in its upper flanged portion to tightly receive the pin and support it against lateral movement, and said aperture extending into the threaded lower portion in the portion thereof adapted to be engaged by the threads of the disc whereby the insertion of the lock pin will cut a groove in the threads of the disc.

FREDERICK H. HEHEMANN.